UNITED STATES PATENT OFFICE.

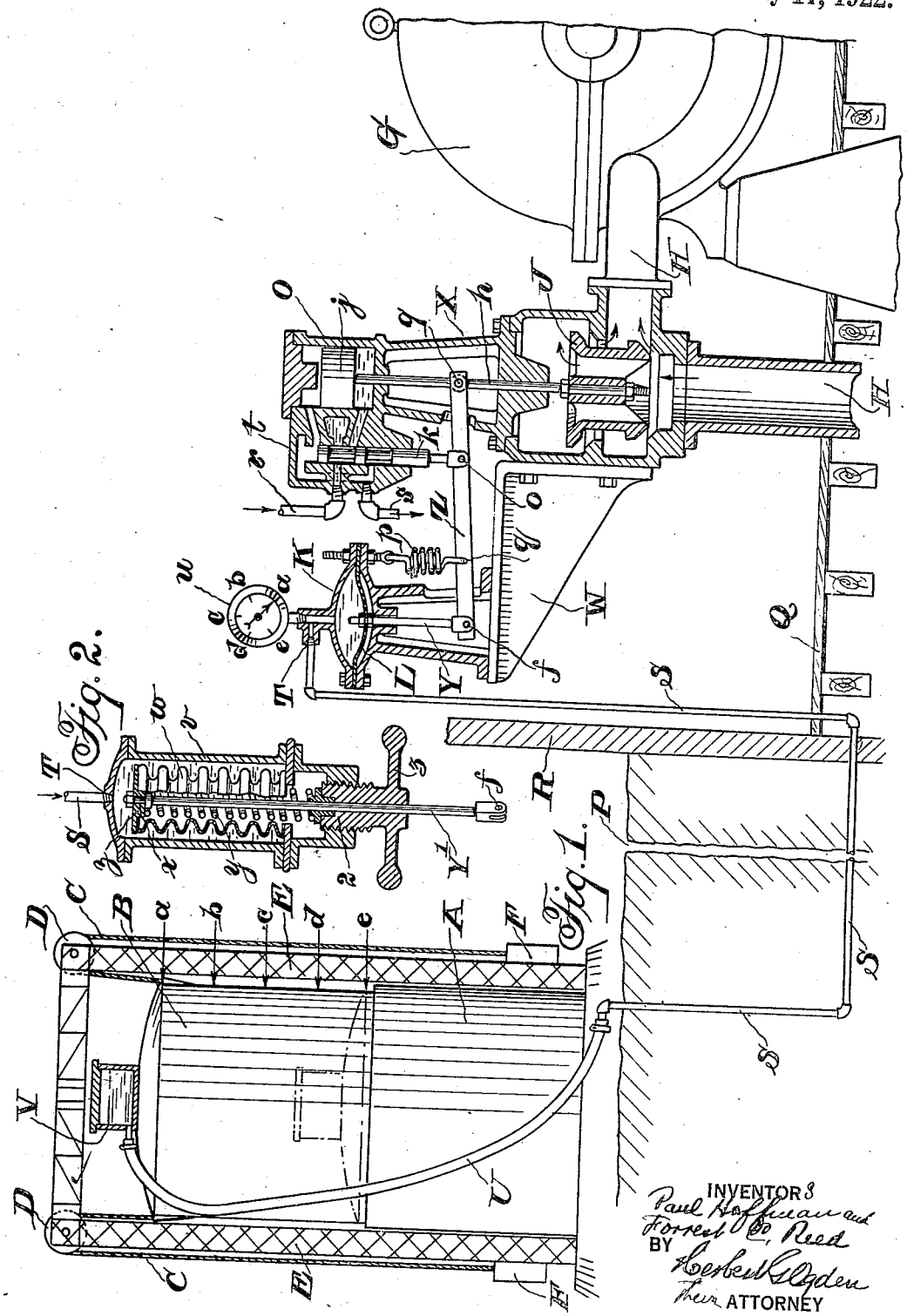

PAUL HOFFMAN, OF EASTON, PENNSYLVANIA, AND FORREST C. REED, OF HARRIETTE, MICHIGAN, ASSIGNORS TO INGERSOLL-RAND COMPANY, OF JERSEY CITY, NEW JERSEY, A CORPORATION OF NEW JERSEY.

GAS-BOOSTER REGULATOR.

1,422,573.  Specification of Letters Patent.  Patented July 11, 1922.

Application filed October 20, 1920. Serial No. 418,277.

*To all whom it may concern:*

Be it known that we, PAUL HOFFMAN, a citizen of the United States, and resident of Easton, county of Northampton, and State of Pennsylvania, and FORREST C. REED, a citizen of the United States, and resident of Harriette, county of Wexford, and State of Michigan, have invented a certain new and useful Improvement in Gas-Booster Regulators, of which the following is a specification accompanied by drawings.

This invention relates to an apparatus for regulating the output of a power driven machine for boosting or compressing the gas supplied to the machine from a tank or holder.

Such a machine may be used for instance, to compress the surplus gas obtained from by-product coke ovens and deliver it, at a certain pressure, for use in steel furnaces and for other industrial purposes. The surplus gas before reaching the boosters, is usually collected in a gas tank or holder having the usual gas bell, and since the volume of gas in the holder fluctuates somewhat, the output of the booster should conform to these variations, in order to prevent the emptying of the gas bell and also to prevent filling the gas bell to the point of overflowing. The emptying of the gas holder involves the danger of air leaks and if the booster suction continues unchecked, a collapse of the bell may take place. On the other hand whenever the gas holder fills up completely, it becomes necessary to bleed off some of the gas, which is wasted.

Ordinarily, gas boosters are regulated by hand and the speed of the machine varied in order to insure, as nearly as possible, an average position of the gas bell, but such hand regulation introduces the element of human fallibility resulting in poor regulation or even more serious results. A constant intake suction regulator has also been provided, in the attempt to regulate by means of a device which will react upon the very slight changes in pressure in the gas holder which accompany the up and down movement of the bell. But in order to work correctly, this regulator must be exceedingly sensitive, since these pressure variations in the gas holder usually amount to less than one quarter inch of water between extreme positions and such regulators have generally been found to be impracticable.

It is to be borne in mind that the gas booster apparatus may be at a considerable distance, perhaps several hundred yards in location from the gas holder and connected thereto by a pipe line so that hand regulation of the booster necessitates some form of signalling system between operators stationed at the holder and at the boosting apparatus. This arrangement is inconvenient and impracticable and mistakes are liable to occur.

The primary objects of the present invention are to overcome the difficulties and disadvantages of the regulation heretofore practised and secure a regulator for the output of the booster, preferably connected to control the inlet valve of the machine, and responsive to hydrostatic pressure dependent upon the elevation of the gas bell of the supply tank or holder for the booster. By this means the driving element of the booster is regulated in accordance with the varying conditions of supply of gas to the tank or holder and the regulator tends to maintain the gas bell of the tank in a certain average position.

One way of carrying out the invention is to mount a liquid receptacle in such manner that it is movable vertically in accordance with the vertical travel of the gas bell of the tank or holder supplying the booster and to connect said tank of liquid with the regulator so that the inlet valve of the machine is controlled in accordance with the movements of the gas bell and dependent on the elevation of the bell. Pressure in the regulator then rises and falls with the rise and fall of the gas bell, causing the driving element to increase or decrease in speed in accordance with the rise and fall of the bell, whereby the regulator tends to maintain the gas bell in a certain average position.

One of the principal advantages of this construction resides in the fact that, since the extreme positions of the gas bell usually differ by from thirty to forty-five feet, the difference in pressure available for the purposes of the regulation are comparatively large and will permit the building of a sensitive as well as rugged apparatus, which will readily develop the power necessary to set in motion the operative parts of the inlet valve which may be a steam inlet valve for the booster apparatus.

Furthermore our improved apparatus is not only entirely automatic in regulating the speed of the booster but is more positive in action than in the apparatus heretofore devised.

Further objects of the invention will hereinafter appear and to all of these ends the invention consists of the apparatus and devices and combinations of elements substantially as hereinafter fully described and claimed in this specification and shown in the accompanying drawings in which—

Figure 1 is a diagrammatic side elevation partly in vertical section illustrating an arrangement of a gas tank or holder and booster provided with our regulating apparatus, and Figure 2 is a detail vertical sectional elevation of a modified form of a portion of the regulator.

Referring to the drawings A represents a gas tank or holder having the rising and falling gas bell B constructed in any suitable manner and shown in this instance connected to the ropes or cables C passing over the pulleys D on the frame E and connected to the weights F. The gas bell B is shown in its upper position in full lines and in its lower position in dotted lines and the vertical travel of the bell which may amount to from thirty to forty-five feet is indicated between the arrows marked a and e. Intermediate positions of the bell are indicated by the arrows marked b, c and d.

The driving element of the booster is indicated diagrammatically in this instance as a steam turbine G assumed to be operatively connected to drive the booster (not shown) which may however form a part of the turbine itself. The surplus gas from by-product coke ovens for instance may be delivered to the gas holder A and the booster draws its supply of gas from the holder. Steam is supplied to the turbine G through the inlet pipe H and a steam valve J of any suitable form is provided for controlling the inlet H. In Figure 1 a constant pressure regulator K is shown having a diaphragm L subject to certain pressure variations and, in this instance, an oil relay O is provided for transmitting and amplifying the movement of the diaphragm L in order to actuate and control the steam admission valve J of the turbine driving the booster. It is to be understood that the gas holder A and the boosting apparatus may be widely separated from each other as indicated by the break P between the two sections of the drawing shown in Figure 1. The power house for the gas booster apparatus indicated diagrammatically by the floor Q and a portion of one side wall R may be placed in any desired position distant from the gas holder A. A pipe connection S may lead as shown underground from the location of the holder A to the power house and is connected to the regulator K at T. The other end of the pipe S may be connected by a flexible hose U to an open liquid holding tank V preferably mounted on top of the gas bell B although this receptacle V could be mounted in any suitable manner to move up and down in accordance with the travel of the gas bell and we are not to be understood as limiting the invention to a liquid receptacle mounted on top of the gas bell. If desired, means may be provided for keeping the pressure tank or receptacle V full of liquid as for instance oil, and thereby compensating for eventual leaks in the system. The pressure variation in the pipe lines S and U and on the diaphragm L of the regulator K is created by the vertical movement of the gas bell B. The oil or other liquid in the pipe line is under hydrostatic pressure and the amount of the pressure depends on the elevation of the tank or receptacle V mounted on the gas bell.

Operative connections are provided between the regulator K and the steam inlet valve J which may include the oil relay O so that if the gas bell rises, the pressure in the pipe system, and on the diaphragm L, increases, the valve J is opened more widely and the machine is speeded up and draws more heavily on the gas holder. Consequently, the bell will drop, in which case the hydrostatic pressure on the regulator decreases and the speed of the turbine is slowed down. The tendency of the regulator will be to maintain a certain average position of the gas bell which can be predetermined by suitable adjustments as for instance an adjustable spring in the regulator which compensates for the pressure exerted on the diaphragm, or other regulating device shown in Figure 2 for instance, to be described, may be used.

In the diagrammatic representation of the apparatus shown in Figure 1, the regulator K may be conveniently mounted on a bracket W adjacent the casing X of the oil relay O, and the diaphragm L in this instance is connected by a rod Y to one end of the lever Z at the point f. The other end of the lever Z is pivoted at g to the valve stem h having a piston j operating in the oil relay cylinder and controlled by a valve k having its valve stem also pivoted to the lever Z at the point o. An adjustable spring p is connected to the casing of the regulator K and also to the lever Z at the point q between the points of attachment of the diaphragm L and the stem of the valve k so that the spring p normally tends to pull the lever upwardly. Oil is supplied to the oil relay through the inlet pipe r and may discharge through the pipe s. Suitable ports and passages are provided in the oil relay valve chest t controlled by the valve k for distributing the oil above and below the piston or plunger j on the inlet valve stem h. An indicator u may be provided on the regulator K having marks or indications a, b, c, d and e corresponding to the arrows a, b, c, d and e designating different heights of the gas bell in its travel.

In the operation of the apparatus let it be assumed that the gas bell B is at the top of its travel as indicated in Figure 1 at which case the indicator u will stand at the mark a and the parts of the regulator K and the oil relay O will be in substantially the positions indicated in the drawing with the steam inlet valve J open to a given extent. If the gas bell B falls through a given distance the hydrostatic pressure in the pipe system and on the diaphragm L will decrease in which case the diaphragm will rise, first shifting the valve k upwardly to admit fluid pressure above the piston or plunger j in the oil relay, which will depress said piston tending to close the steam inlet valve J to a certain extent necessary to reduce the speed of the turbine the required amount. Such regulation will continue automatically and the steam inlet valve J will be opened or closed the desired amount in accordance with the elevation of the gas bell.

In Figure 2 a modified form of regulator is shown comprising a casing v to which the pipe system S is adapted to be connected as at T it being understood that the device shown in Figure 2 may be substituted for the regulator K shown in Figure 1. Within the casing v is arranged a controllable and expansible member w in the form of a corrugated or crimped sheet metal tube or cylinder to which the rod Y' is connected at the top at the point x. The other end of the rod is adapted to be connected to the lever Z at the point f as in Figure 1. Within the collapsible member w is arranged a spring y adapted to be compressed between the cap z and adjustable screw threaded plug 2 having an adjustable handle 3 so that the tension of the spring may be varied. The spring opposes the fluid pressure in the casing v and the operation of the regulator is substantially like the diaphragm regulator illustrated in Figure 1.

We claim—

1. Apparaus for regulating the output of a power driven machine for boosting or compressing gas, comprising in combination with the supply tank or holder of gas and a gas bell for supplying the booster, of the inlet valve of the driving element of the machine, and a regulator connected to control said valve and responsive to hydrostatic pressure dependent upon the elevation of the said gas bell of the supply tank or holder, whereby the said driving element is regulated in accordance with the varying conditions of supply of gas to said tank and the regulator tends to maintain the gas bell of the tank in a certain average position.

2. Apparatus for regulating the output of a power driven machine for boosting or compressing gas, comprising in combination with the supply tank or holder of gas and a gas bell for supplying the booster, of the inlet valve of the driving element of the machine, and a regulator responsive to liquid fluid pressure connected to control said inlet valve, a liquid receptacle movable vertically in accordance with the vertical travel of the said gas bell of the tank or holder, and a connection between said receptacle and the said variable pressure regulator, whereby the said valve is controlled in accordance with the movements of the gas bell.

3. Apparatus for regulating the output of a power driven machine for boosting or compressing gas, consisting of a gas tank forming a supply holder for the booster, and a regulator operating in accordance with the fluctuating volume of gas in said gas tank, said regulator comprising in combination with the inlet valve of the driving element of the machine, of a regulator responsive to variable liquid fluid pressure connected to control said inlet valve, a liquid receptacle mounted for vertical movement corresponding to the vertical movement of the gas bell of the said holder or tank under varying conditions of supply of gas to the tank or holder and a connection between said liquid receptacle and the said variable pressure regulator, whereby said valve is controlled in accordance with the variations in elevation of the said gas bell.

4. Apparatus for regulating the output of a power driven machine for boosting or compressing gas, comprising in combination with the supply tank or holder of gas and a gas bell for supplying the booster, of the inlet valve of the driving element of the machine, and a regulator connected to control said valve and responsive to hydrostatic pressure dependent upon the elevation of the said gas bell of the supply tank or holder, the pressure in said regulator rising and falling with the rise and fall of the gas bell, and causing the said driving element to increase or decrease in speed in accordance with said rise and fall of the gas bell, whereby the regulator tends to maintain the gas bell in a certain average position.

In testimony whereof we have signed this specification.

PAUL HOFFMAN.
FORREST C. REED.